United States Patent
Zhang

(10) Patent No.: US 9,214,113 B2
(45) Date of Patent: Dec. 15, 2015

(54) BACKLIGHT DRIVING CIRCUIT AND LIQUID CRYSTAL DISPLAY DEVICE

(71) Applicant: Shenzhen China Star Optoelectronics Technology Co., Ltd., Guangdong (CN)

(72) Inventor: Hua Zhang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 199 days.

(21) Appl. No.: 14/130,327

(22) PCT Filed: Dec. 6, 2013

(86) PCT No.: PCT/CN2013/088714
§ 371 (c)(1),
(2) Date: Dec. 31, 2013

(87) PCT Pub. No.: WO2015/078038
PCT Pub. Date: Jun. 4, 2015

(65) Prior Publication Data
US 2015/0154921 A1 Jun. 4, 2015

(30) Foreign Application Priority Data

Nov. 29, 2013 (CN) .......................... 2013 1 0629006

(51) Int. Cl.
*H05B 33/08* (2006.01)
*G09G 3/34* (2006.01)

(52) U.S. Cl.
CPC .......... *G09G 3/3426* (2013.01); *H05B 33/0803* (2013.01); *H05B 33/0815* (2013.01); *G09G 2330/00* (2013.01); *G09G 2330/02* (2013.01); *G09G 2330/04* (2013.01); *G09G 2330/08* (2013.01); *G09G 2330/12* (2013.01)

(58) Field of Classification Search
None
See application file for complete search history.

(56) References Cited

U.S. PATENT DOCUMENTS 8,988,013 B2 * 3/2015 McRae ................ H05B 33/089
315/185 R

* cited by examiner

*Primary Examiner* — Douglas W Owens
*Assistant Examiner* — Dedei K Hammond

(57) ABSTRACT

A backlight driving circuit and a liquid crystal display device are described. The backlight driving circuit drives at least one LED bar and includes a power supply module, a switch module, and a detection module. When the detection module detects that a positive polarity end of a power supply voltage of the power supply module is electrically coupled to a negative polarity end of the LED bar, the switch module switches the positive polarity end of the power supply voltage to be electrically coupled to the positive polarity end of the LED bar and switches a negative polarity end of the power supply voltage to be electrically coupled to a negative polarity end of the LED bar. The present invention can detect the polarities of the LED bar so that the LED bar can keep on working normally.

16 Claims, 3 Drawing Sheets

BACKLIGHT DRIVING CIRCUIT AND LIQUID CRYSTAL DISPLAY DEVICE

RELATED APPLICATIONS

This application is a National Phase of PCT Patent Application No. PCT/CN2013/088714 having International filing date of Dec. 6, 2013, which claims the benefit of priority of Chinese Patent Application No. 201310629006.0 filed on Nov. 29, 2013. The contents of the above applications are all incorporated by reference as if fully set forth herein in their entirety.

BACKGROUND OF THE INVENTION

1. Field of the Invention

The present invention generally relates to a driving circuit, and more particularly to a backlight driving circuit and a liquid crystal display device having the backlight driving circuit.

2. Description of Prior Art

A liquid crystal display device mainly comprises a liquid crystal panel and a backlight module. The backlight module is utilized for providing light when the liquid crystal panel displays an image. Light emitting diodes (LEDs) are utilized as a light source in the conventional backlight module. A backlight driving circuit provides a required driving current for driving the light source.

The light source comprises a plurality of light emitting diodes. Since a thickness of the liquid crystal panel is required to be narrower, the light emitting diodes are divided into a plurality of light emitting diode bars in parallel. Each of the light emitting diode bars is electrically coupled to the backlight driving circuit via a connector. More particularly, a positive polarity end of each of the light emitting diode bars is electrically coupled to a positive polarity end of an output voltage of the backlight driving circuit via the connector, and a negative polarity end of each of the light emitting diode bars is electrically coupled to a negative polarity end of the output voltage of the backlight driving circuit.

When the positive polarity end of each of the light emitting diode bars is electrically coupled to the negative polarity end of the output voltage of the backlight driving circuit via the connector and the negative polarity end of each of the light emitting diode bars is electrically coupled to the positive polarity end of the output voltage of the backlight driving circuit, that is, the two ends of each of the light emitting diode bars are electrically to a reverse output voltage, the light emitting diodes of each of the light emitting diode bars are broken down and destroyed.

Consequently, there is a need to solve the problem that the light emitting diodes of each of the light emitting diode bars are destroyed when the positive polarity end and the negative polarity end of each of the light emitting diode bars are electrically coupled to the reverse output voltage in the prior arts.

SUMMARY OF THE INVENTION

An objective of the present invention is to provide a backlight driving circuit and a liquid crystal display device capable of ensuring that a light emitting diode bar can work normally when the light emitting diode bar is electrically coupled to a reversed voltage.

To solve the above-mentioned problem, a backlight driving circuit provided by the present invention is utilized for driving at least one light emitting diode bar. The backlight driving circuit comprises a power supply module, a switch module, a control module, and a detection module. The power supply module is utilized for providing a power supply voltage. The switch module is electrically coupled to the power supply module. The control module is electrically coupled to the power supply module, the switch module, and the light emitting diode bar for adjusting an amplitude of the power supply voltage outputted by the power supply module. The detection module is electrically coupled to the switch module and comprises a first comparator for detecting a positive polarity end of the power supply voltage. When the first comparator of the detection module detects that the positive polarity end of the power supply voltage of the power supply module is electrically coupled to a negative polarity end of the light emitting diode bar, the switch module switches the positive polarity end of the power supply voltage of the power supply module to be electrically coupled to the positive polarity end of the light emitting diode bar and switches a negative polarity end of the power supply voltage of the power supply module to be electrically coupled to a negative polarity end of the light emitting diode bar.

In the backlight driving circuit of the present invention, the control module is an integrated circuit.

In the backlight driving circuit of the present invention, the power supply module comprises a power supply, a coil, and a diode. A first end of the coil is electrically coupled to the power supply. A second end of the coil is electrically coupled to an anode of the diode. The coil is utilized for converting a voltage of the power supply to the power supply voltage suitable for the light emitting diode bar. A cathode of the diode is electrically coupled to the switch module for preventing a reverse current.

In the backlight driving circuit of the present invention, the detection module further comprises a second comparator for detecting the negative polarity end of the power supply voltage.

In the backlight driving circuit of the present invention, the detection module further comprises a third comparator and a fourth comparator. The switch module comprises a first N-type metal-oxide-semiconductor transistor, a second N-type metal-oxide-semiconductor transistor, a third N-type metal-oxide-semiconductor transistor, and a fourth N-type metal-oxide-semiconductor transistor. The third comparator is utilized for controlling turn-on states and turn-off states of the first N-type metal-oxide-semiconductor transistor and the second N-type metal-oxide-semiconductor transistor. The fourth comparator is utilized for controlling turn-on states and turn-off states of the third N-type metal-oxide-semiconductor transistor and the fourth N-type metal-oxide-semiconductor transistor.

To solve the above-mentioned problem, a backlight driving circuit provided by the present invention is utilized for driving at least one light emitting diode bar. The backlight driving circuit comprises a power supply module, a switch module, and a detection module. The power supply module is utilized for providing a power supply voltage. The switch module is electrically coupled to the power supply module. The detection module is electrically coupled to the switch module. When the detection module detects that a positive polarity end of the power supply voltage of the power supply module is electrically coupled to a negative polarity end of the light emitting diode bar, the switch module switches the positive polarity end of the power supply voltage of the power supply module to be electrically coupled to the positive polarity end of the light emitting diode bar and switches a negative polarity end of the power supply voltage of the power supply module to be electrically coupled to a negative polarity end of the light emitting diode bar.

The backlight driving circuit of the present invention further comprises a control module electrically coupled to the power supply module, the switch module, and the light emitting diode bar for adjusting an amplitude of the power supply voltage outputted by the power supply module.

In the backlight driving circuit of the present invention, the control module is an integrated circuit.

In the backlight driving circuit of the present invention, the power supply module comprises a power supply, a coil, and a diode. A first end of the coil is electrically coupled to the power supply. A second end of the coil is electrically coupled to an anode of the diode. The coil is utilized for converting a voltage of the power supply to the power supply voltage suitable for the light emitting diode bar. A cathode of the diode is electrically coupled to the switch module for preventing a reverse current.

In the backlight driving circuit of the present invention, the detection module comprises a first comparator and a second comparator. The first comparator is utilized for detecting the negative polarity end of the power supply voltage. The second comparator is utilized for detecting the negative polarity end of the power supply voltage.

In the backlight driving circuit of the present invention, the detection module further comprises a third comparator and a fourth comparator. The switch module comprises a first N-type metal-oxide-semiconductor transistor, a second N-type metal-oxide-semiconductor transistor, a third N-type metal-oxide-semiconductor transistor, and a fourth N-type metal-oxide-semiconductor transistor. The third comparator is utilized for controlling turn-on states and turn-off states of the first N-type metal-oxide-semiconductor transistor and the second N-type metal-oxide-semiconductor transistor. The fourth comparator is utilized for controlling turn-on states and turn-off states of the third N-type metal-oxide-semiconductor transistor and the fourth N-type metal-oxide-semiconductor transistor.

The present invention further provides a liquid crystal display device comprising a backlight driving circuit. The backlight driving circuit is utilized for driving at least one light emitting diode bar and comprises a power supply module, a switch module, a control module, and a detection module. The power supply module is utilized for providing a power supply voltage. The switch module is electrically coupled to the power supply module. The control module is electrically coupled to the power supply module, the switch module, and the light emitting diode bar for adjusting an amplitude of the power supply voltage outputted by the power supply module. The detection module is electrically coupled to the switch module and comprises a first comparator for detecting a positive polarity end of the power supply voltage. When the first comparator of the detection module detects that the positive polarity end of the power supply voltage of the power supply module is electrically coupled to a negative polarity end of the light emitting diode bar, the switch module switches the positive polarity end of the power supply voltage of the power supply module to be electrically coupled to the positive polarity end of the light emitting diode bar and switches a negative polarity end of the power supply voltage of the power supply module to be electrically coupled to a negative polarity end of the light emitting diode bar.

In the liquid crystal display device of the present invention, the control module is an integrated circuit.

In the liquid crystal display device of the present invention, the power supply module comprises a power supply, a coil, and a diode. A first end of the coil is electrically coupled to the power supply. A second end of the coil is electrically coupled to an anode of the diode. The coil is utilized for converting a voltage of the power supply to the power supply voltage suitable for the light emitting diode bar. A cathode of the diode is electrically coupled to the switch module for preventing a reverse current.

In the liquid crystal display device of the present invention, the detection module further comprises a second comparator for detecting the negative polarity end of the power supply voltage.

In the liquid crystal display device of the present invention, the detection module further comprises a third comparator and a fourth comparator. The switch module comprises a first N-type metal-oxide-semiconductor transistor, a second N-type metal-oxide-semiconductor transistor, a third N-type metal-oxide-semiconductor transistor, and a fourth N-type metal-oxide-semiconductor transistor. The third comparator is utilized for controlling turn-on states and turn-off states of the first N-type metal-oxide-semiconductor transistor and the second N-type metal-oxide-semiconductor transistor. The fourth comparator is utilized for controlling turn-on states and turn-off states of the third N-type metal-oxide-semiconductor transistor and the fourth N-type metal-oxide-semiconductor transistor.

Compared with the prior arts, the backlight driving circuit and the liquid crystal display device of the present invention are capable of detecting the polarities of the light emitting diode bar. When the polarities of the light emitting diode bar are wrongly coupled to the polarities of the power supply voltage, the polarities of the power supply voltage can be automatically adjusted so that the light emitting diode bar can keep on working normally.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures.

Figure 1:
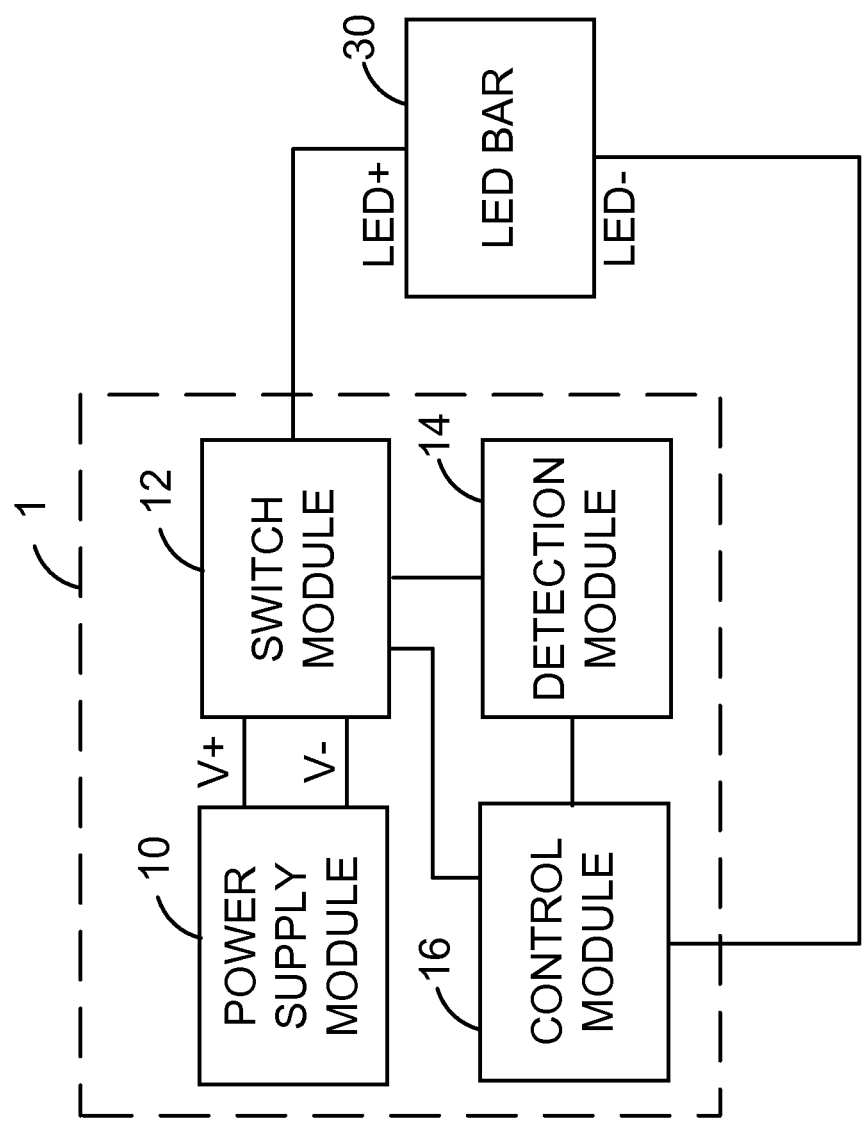
FIG. 1 illustrates a block diagram of a backlight driving circuit in accordance with an embodiment of the present invention.

Please refer to FIG. 1. FIG. 1 illustrates a block diagram of a backlight driving circuit 1 in accordance with an embodiment of the present invention.

The backlight driving circuit 1 is utilized for driving at least one light emitting diode (LED) bar 30. The backlight driving circuit 1 comprises a power supply module 10, a switch module 12, a detection module 14, and a control module 16.

Figure 2:
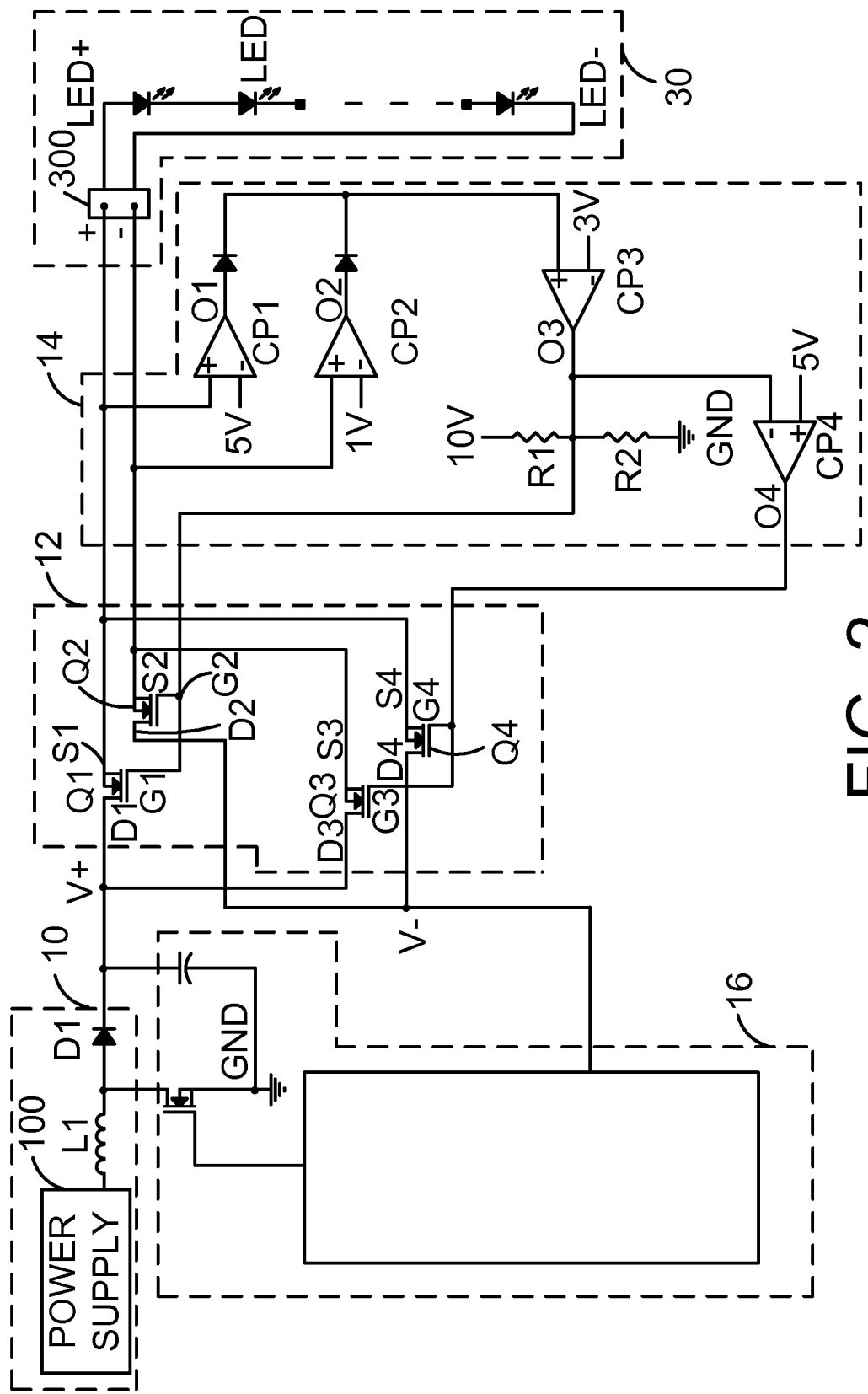
FIG. 2 illustrates detailed circuits of the backlight driving circuit and an LED bar in FIG. 1.

The LED bar 30 comprises a plurality of light emitting diodes LED electrically coupled in series and a connector 300 as shown in FIG. 2. The light emitting diodes LED electrically coupled in series have a positive polarity end LED+ and a negative polarity end LED− as shown in FIG. 2. The positive polarity end LED+ and the negative polarity end LED− are electrically coupled to two ends of the connector 300. Each of the light emitting diodes LED has an anode and a cathode.

The power supply module 10 is utilized for providing a power supply voltage for driving the LED bar 30 via the switch module 12. The power supply voltage comprises a positive polarity end V+ and a negative polarity end V−. The power supply module 10 is further providing power for the control module 16.

The switch module 12 is electrically coupled to the power supply module 10. The detection module 14 is electrically coupled to the switch module 12. The control module 16 is electrically coupled to the power supply module 10, the switch module 12, and the LED bar 30.

When the detection module 14 detects that the positive polarity end V+ of the power supply voltage of the power supply module 10 is electrically coupled to the negative polarity end LED− of the LED bar 30, the switch module 12 switches the positive polarity end V+ of the power supply voltage of the power supply module 10 to be electrically coupled to the positive polarity end LED+ of the LED bar 30 and switches the negative polarity end V− of the power supply voltage of the power supply module 10 to be electrically coupled to the negative polarity end LED− of the LED bar 30.

Please refer to FIG. 1 and FIG. 2. FIG. 2 illustrates detailed circuits of the backlight driving circuit 1 and the LED bar 30 in FIG. 1.

The power supply module 10 comprises a power supply 100, a coil L1, and a diode D1. A first end of the coil L1 is electrically coupled to the power supply 100, and a second end of the coil L1 is electrically coupled to an anode of the diode D1. The coil L1 is utilized for converting a voltage of the power supply 100 to the power supply voltage which is suitable for the LED bar 30 and the control module 16. A cathode of the diode D1 is electrically coupled to the switch module 12 for preventing a reverse current.

It is noted that the coil L1 is an optional element. When the power supply 100 can provide the power supply voltage suitable for the LED bar 30 and the control module 16, the coil L1 may be omitted.

The switch module 12 comprises a first N-type metal-oxide-semiconductor (N-MOS) transistor Q1, a second N-MOS transistor Q2, a third N-MOS transistor Q3, and a fourth N-MOS transistor Q4.

The first N-MOS transistor Q1 comprises a gate G1, a drain D1, and a source S1. The drain D1 and the source S1 of the first N-MOS transistor Q1 are respectively electrically coupled to the positive polarity end V+ of the power supply voltage and a positive polarity end + of the connector 300.

The second N-MOS transistor Q2 comprises a gate G2, a drain D2, and a source S2. The drain D2 and the source S2 of the second N-MOS transistor Q2 are respectively electrically coupled to the negative polarity end V− of the power supply voltage and a negative polarity end − of the connector 300.

The third N-MOS transistor Q3 comprises a gate G3, a drain D3, and a source S3. The drain D3 and the source S3 of the third N-MOS transistor Q3 are respectively electrically coupled to the positive polarity end V+ of the power supply voltage and the negative polarity end − of the connector 300.

The fourth N-MOS transistor Q4 comprises a gate G4, a drain D4, and a source S4. The drain D4 and the source S4 of the fourth N-MOS transistor Q4 are respectively electrically coupled to the negative polarity end V− of the power supply voltage and the positive polarity end + of the connector 300.

The detection module 14 comprises a first comparator CP1, a second comparator CP2, a third comparator CP3, a fourth comparator CP4, a first resistor R1, and a second resistor R2.

The first comparator CP1 comprises a non-inverting input +, an inverting input −, and an output O1. The non-inverting input + and the inverting input − of the first comparator CP1 are respectively electrically coupled to the positive polarity end + of the connector 300 and a voltage source +5V (voltage). The first comparator CP1 is utilized for detecting the positive polarity end V+ of the power supply voltage.

The second comparator CP2 comprises a non-inverting input +, an inverting input −, and an output O2. The non-inverting input + and the inverting input − of the second comparator CP2 are respectively electrically coupled to the negative polarity end − of the connector 300 and a voltage source +1 V. The second comparator CP2 is utilized for detecting the negative polarity end V− of the power supply voltage.

The third comparator CP3 comprises a non-inverting input +, an inverting input −, and an output O3. The non-inverting input + of the third comparator CP3 is electrically coupled to the output O1 of the first comparator CP1 and the output O2 of the second comparator CP2. The inverting input − of the third comparator CP3 is electrically coupled to a voltage source +3V. The third comparator CP3 is utilized for controlling turn-on states and turn-off states of the first N-MOS transistor Q1 and the second N-MOS transistor Q2.

The fourth comparator CP4 comprises a non-inverting input +, an inverting input −, and an output O4. The non-inverting input + of the fourth comparator CP4 is electrically coupled to a voltage source +5V. The inverting input − of the fourth comparator CP4 is electrically coupled to the output O3 of the third comparator CP3 and is electrically between the first resistor R1 and the second resistor R2. The output O4 of the fourth comparator CP4 is electrically coupled to the gate G3 of the third N-MOS transistor Q3 and the gate G4 of the fourth N-MOS transistor Q4. The fourth comparator CP4 is utilized for controlling turn-on states and turn-off states of the third N-MOS transistor Q3 and the fourth N-MOS transistor Q4.

A first end of the first resistor R1 is electrically coupled to a voltage source +10V, and a second end of the first resistor R1 is electrically coupled to a first end of the second resistor R2. A second end of the second resistor R2 is electrically coupled to a ground GND.

When the backlight driving circuit 1 starts to work, resistance values of the first resistor R1 and the second resistor R2 are designed appropriately so that a voltage across the second resistor R2 turns on the first N-MOS transistor Q1 and the second N-MOS transistor Q2 and turns the output O4 of the fourth comparator CP4 to a low level. When the output O4 of the fourth comparator CP4 is at a low level, the third N-MOS transistor Q3 and the fourth N-MOS transistor Q4 are turned off. The first comparator CP1 detects the positive polarity end V+ of the power supply voltage and outputs a high level. The second comparator CP2 detects the negative polarity end V− of the power supply voltage. When the LED bar 30 is forwardly connected, that is, the positive polarity end LED+ of the LED bar 30 is electrically coupled to the positive polarity end V+ of the power supply voltage and the negative polarity end LED− of the LED bar 30 is electrically coupled to the negative polarity end V− of the power supply voltage, the negative polarity end V− of the power supply voltage has a specific numerical value. The output O2 of the second comparator CP2 is at a high level, and the output O3 of the third comparator CP3 is at a high level. The first N-MOS transistor Q1 and the second N-MOS transistor Q2 remain the turn-on states.

Figure 3:
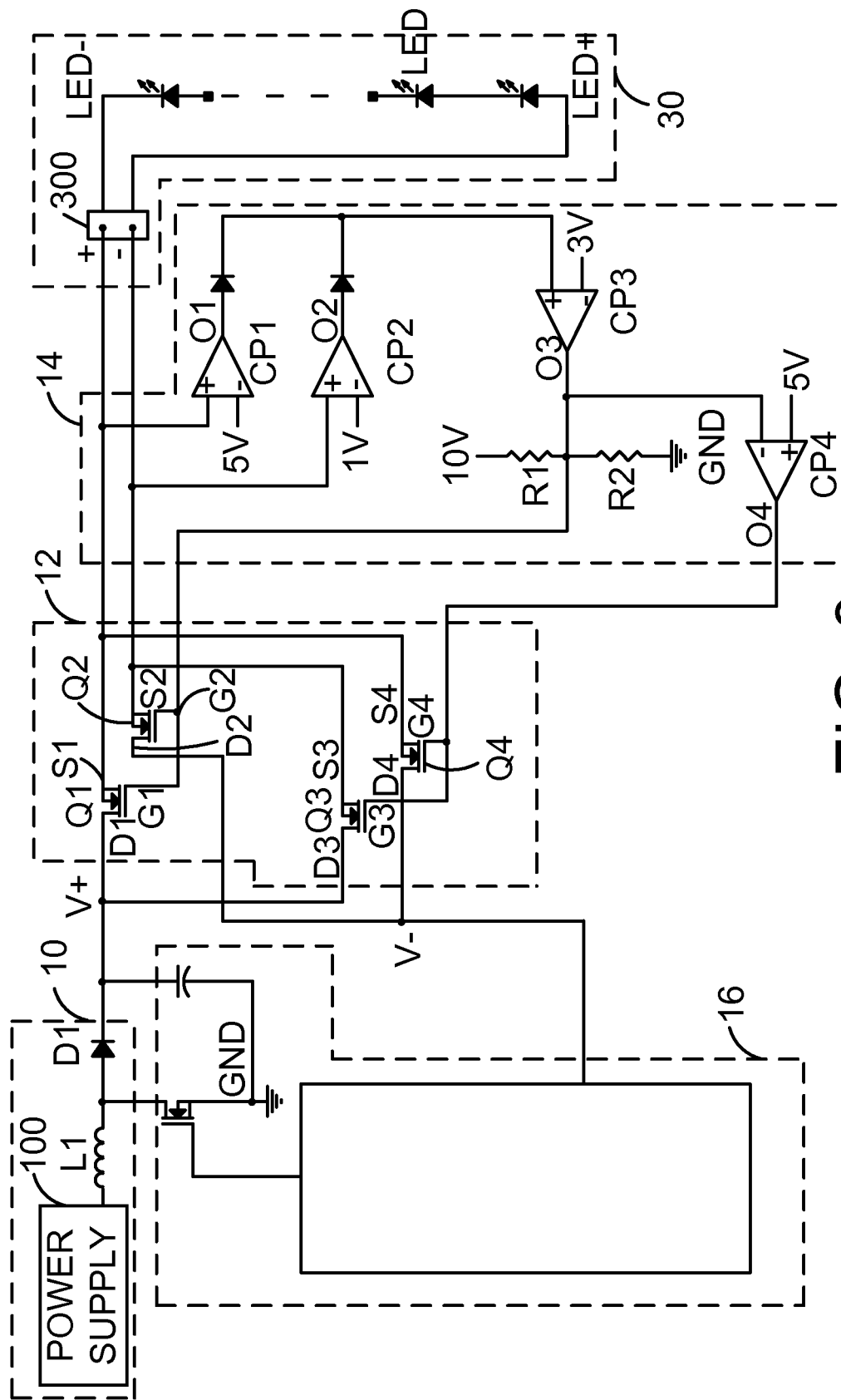
FIG. 3 illustrates that a circuit of the LED bar is reversely connected.

When the LED bar 30 is reversely connected as shown in FIG. 3, that is, the positive polarity end LED+ of the LED bar 30 is electrically coupled to the negative polarity end V− of the power supply voltage and the negative polarity end LED− of the LED bar 30 is electrically coupled to the positive polarity end V+ of the power supply voltage, the LED bar 30 cannot be turned on. The negative polarity end V− of the power supply voltage is 0 volt. The output O2 of the second comparator CP2 is at a low level. The voltage of the non-inverting input + of the third comparator CP3 is lower than the voltage of the inverting input −, and the output of the third comparator CP3 is at a low level. The first N-MOS transistor Q1 and the second N-MOS transistor Q2 are turned off. The output O4 of the fourth comparator CP4 is at a high level. The third N-MOS transistor Q3 and the fourth N-MOS transistor Q4 are turned on. Then, the positive polarity end V+ of the power supply voltage is switched to be electrically coupled to the negative polarity end − of the connector 300 (i.e. electrically coupled to the positive polarity end LED+ of the LED bar 30), and the negative polarity end V− of the power supply voltage is switched to be electrically coupled to the positive polarity end + of the connector 300 (i.e. electrically coupled to the negative polarity end LED− of the LED bar 30). The output O1 of the first comparator CP1 is at a low level, and the output O2 of the second comparator CP2 is at a high level. Accordingly, the output O3 of the third comparator CP3 is at a low level. The first N-MOS transistor Q1 and the second N-MOS transistor Q2 remain the turn-off states, and the LED bar can still work normally.

The control module 16 may be an integrated circuit (IC) and utilized for adjusting an amplitude of the power supply voltage outputted by the power supply module 10.

There is one LED bar 30 in the embodiment of FIG. 2. In another embodiment, a number of the LED bar 30 is not limited.

In another embodiment, P-type MOS (P-MOS) transistors may be substituted for the first to the fourth N-MOS transistors Q1-Q4.

Furthermore, the present invention further provides a liquid crystal display device, and the liquid crystal display device comprises the above-mentioned backlight driving circuit 1.

The backlight driving circuit and the liquid crystal display device of the present invention are capable of detecting polarities of the LED bar. When the polarities of the LED bar are wrongly coupled to the polarities of the power supply voltage, the polarities of the power supply voltage can be automatically adjusted so that the LED bar can keep on working normally.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A backlight driving circuit, utilized for driving at least one light emitting diode bar, the backlight driving circuit comprising:
a power supply module for providing a power supply voltage;
a switch module electrically coupled to the power supply module;
a control module electrically coupled to the power supply module, the switch module, and the light emitting diode bar for adjusting an amplitude of the power supply voltage outputted by the power supply module; and
a detection module electrically coupled to the switch module, the detection module comprising a first comparator for detecting a positive polarity end of the power supply voltage,
wherein when the first comparator of the detection module detects that the positive polarity end of the power supply voltage of the power supply module is electrically coupled to a negative polarity end of the light emitting diode bar, the switch module switches the positive polarity end of the power supply voltage of the power supply module to be electrically coupled to the positive polarity end of the light emitting diode bar and switches a negative polarity end of the power supply voltage of the power supply module to be electrically coupled to a negative polarity end of the light emitting diode bar.

2. The backlight driving circuit of claim 1, wherein the control module is an integrated circuit.

3. The backlight driving circuit of claim 1, wherein the power supply module comprises:
a power supply;
a coil; and
a diode, a first end of the coil electrically coupled to the power supply, a second end of the coil electrically coupled to an anode of the diode, the coil utilized for converting a voltage of the power supply to the power supply voltage suitable for the light emitting diode bar, a cathode of the diode electrically coupled to the switch module for preventing a reverse current.

4. The backlight driving circuit of claim 1, wherein the detection module further comprises a second comparator for detecting the negative polarity end of the power supply voltage.

5. The backlight driving circuit of claim 4, wherein the detection module further comprises a third comparator and a fourth comparator, the switch module comprises a first N-type metal-oxide-semiconductor transistor, a second N-type metal-oxide-semiconductor transistor, a third N-type metal-oxide-semiconductor transistor, and a fourth N-type metal-oxide-semiconductor transistor, the third comparator is utilized for controlling turn-on states and turn-off states of the first N-type metal-oxide-semiconductor transistor and the second N-type metal-oxide-semiconductor transistor, and the fourth comparator is utilized for controlling turn-on states and turn-off states of the third N-type metal-oxide-semiconductor transistor and the fourth N-type metal-oxide-semiconductor transistor.

6. A backlight driving circuit, utilized for driving at least one light emitting diode bar, the backlight driving circuit comprising:
a power supply module for providing a power supply voltage;
a switch module electrically coupled to the power supply module; and
a detection module electrically coupled to the switch module,
wherein when the detection module detects that a positive polarity end of the power supply voltage of the power supply module is electrically coupled to a negative polarity end of the light emitting diode bar, the switch module switches the positive polarity end of the power supply voltage of the power supply module to be electrically coupled to the positive polarity end of the light emitting diode bar and switches a negative polarity end of the power supply voltage of the power supply module to be electrically coupled to a negative polarity end of the light emitting diode bar.

7. The backlight driving circuit of claim 6, further comprising a control module electrically coupled to the power supply module, the switch module, and the light emitting diode bar for adjusting an amplitude of the power supply voltage outputted by the power supply module.

8. The backlight driving circuit of claim 7, wherein the control module is an integrated circuit.

9. The backlight driving circuit of claim 6, wherein the power supply module comprises:
   a power supply;
   a coil; and
   a diode, a first end of the coil electrically coupled to the power supply, a second end of the coil electrically coupled to an anode of the diode, the coil utilized for converting a voltage of the power supply to the power supply voltage suitable for the light emitting diode bar, a cathode of the diode electrically coupled to the switch module for preventing a reverse current.

10. The backlight driving circuit of claim 6, wherein the detection module comprises:
    a first comparator for detecting the negative polarity end of the power supply voltage; and
    a second comparator for detecting the negative polarity end of the power supply voltage.

11. The backlight driving circuit of claim 10, wherein the detection module further comprises a third comparator and a fourth comparator, the switch module comprises a first N-type metal-oxide-semiconductor transistor, a second N-type metal-oxide-semiconductor transistor, a third N-type metal-oxide-semiconductor transistor, and a fourth N-type metal-oxide-semiconductor transistor, the third comparator is utilized for controlling turn-on states and turn-off states of the first N-type metal-oxide-semiconductor transistor and the second N-type metal-oxide-semiconductor transistor, and the fourth comparator is utilized for controlling turn-on states and turn-off states of the third N-type metal-oxide-semiconductor transistor and the fourth N-type metal-oxide-semiconductor transistor.

12. A liquid crystal display device, comprising a backlight driving circuit for driving at least one light emitting diode bar, the backlight driving circuit comprising:
    a power supply module for providing a power supply voltage;
    a switch module electrically coupled to the power supply module;
    a control module electrically coupled to the power supply module, the switch module, and the light emitting diode bar for adjusting an amplitude of the power supply voltage outputted by the power supply module; and
    a detection module electrically coupled to the switch module, the detection module comprising a first comparator for detecting a positive polarity end of the power supply voltage,
    wherein when the first comparator of the detection module detects that the positive polarity end of the power supply voltage of the power supply module is electrically coupled to a negative polarity end of the light emitting diode bar, the switch module switches the positive polarity end of the power supply voltage of the power supply module to be electrically coupled to the positive polarity end of the light emitting diode bar and switches a negative polarity end of the power supply voltage of the power supply module to be electrically coupled to a negative polarity end of the light emitting diode bar.

13. The liquid crystal display device of claim 12, wherein the control module is an integrated circuit.

14. The liquid crystal display device of claim 12, wherein the power supply module comprises:
    a power supply;
    a coil; and
    a diode, a first end of the coil electrically coupled to the power supply, a second end of the coil electrically coupled to an anode of the diode, the coil utilized for converting a voltage of the power supply to the power supply voltage suitable for the light emitting diode bar, a cathode of the diode electrically coupled to the switch module for preventing a reverse current.

15. The liquid crystal display device of claim 12, wherein the detection module further comprises a second comparator for detecting the negative polarity end of the power supply voltage.

16. The liquid crystal display device of claim 15, wherein the detection module further comprises a third comparator and a fourth comparator, the switch module comprises a first N-type metal-oxide-semiconductor transistor, a second N-type metal-oxide-semiconductor transistor, a third N-type metal-oxide-semiconductor transistor, and a fourth N-type metal-oxide-semiconductor transistor, the third comparator is utilized for controlling turn-on states and turn-off states of the first N-type metal-oxide-semiconductor transistor and the second N-type metal-oxide-semiconductor transistor, and the fourth comparator is utilized for controlling turn-on states and turn-off states of the third N-type metal-oxide-semiconductor transistor and the fourth N-type metal-oxide-semiconductor transistor.

\* \* \* \* \*